United States Patent
Ryman

(10) Patent No.: US 10,474,676 B2
(45) Date of Patent: *Nov. 12, 2019

(54) DATABASE QUERY LANGUAGE GATEWAY

(71) Applicant: International Business Machines Corporation, Armonk, NY (US)

(72) Inventor: Arthur G. Ryman, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 195 days.

This patent is subject to a terminal disclaimer.

(21) Appl. No.: 15/164,107

(22) Filed: May 25, 2016

(65) Prior Publication Data
US 2016/0267137 A1    Sep. 15, 2016

Related U.S. Application Data

(63) Continuation of application No. 13/914,107, filed on Jun. 10, 2013, now Pat. No. 9,384,248, which is a continuation of application No. 13/494,153, filed on Jun. 12, 2012, now Pat. No. 9,183,265.

(51) Int. Cl.
*G06F 16/2453* (2019.01)
*G06F 16/25* (2019.01)

(52) U.S. Cl.
CPC .. *G06F 16/24547* (2019.01); *G06F 16/24534* (2019.01); *G06F 16/258* (2019.01)

(58) Field of Classification Search
CPC ......... G06F 17/30471; G06F 17/30448; G06F 17/30569; G06F 16/24547; G06F 16/24534; G06F 16/258

USPC ........................................................ 707/754
See application file for complete search history.

(56) References Cited

U.S. PATENT DOCUMENTS

| | | | |
|---|---|---|---|
| 5,859,972 A * | 1/1999 | Subramaniam | ... G06F 17/30569 709/203 |
| 5,931,917 A * | 8/1999 | Nguyen | ................ G06Q 20/12 709/203 |
| 6,023,684 A * | 2/2000 | Pearson | ................ G06Q 20/00 705/36 R |
| 6,778,983 B1 | 8/2004 | Bates et al. | |
| 7,099,891 B2 | 8/2006 | Haris et al. | |
| 7,587,447 B2 | 9/2009 | Ryman | |

(Continued)

FOREIGN PATENT DOCUMENTS

EP    2296094 A1    3/2011

OTHER PUBLICATIONS

T. Berners-Lee, "Linked Data—Design Issues", [http://www.w3.org/DesignIssues/LinkedData.html] pp. 1-9, (2006.

(Continued)

*Primary Examiner* — Phuong Thao Cao
(74) *Attorney, Agent, or Firm* — Cantor Colburn LLP; Aaron Pontikos

(57) ABSTRACT

The disclosed herein relates to a database endpoint device, a database, and a gateway. The database is external to and communicatively coupled to the database endpoint device. The database includes a memory storing data. The gateway is external to and communicatively coupled to the database endpoint device. The gateway includes a controller. A data service is provided to at least one program. The data is provided via the data service as requested by the at least one program.

12 Claims, 6 Drawing Sheets

(56) References Cited

U.S. PATENT DOCUMENTS

| | | | |
|---|---|---|---|
| 7,685,304 B2 | 3/2010 | Kothari | |
| 7,730,034 B1 | 6/2010 | Deflaux et al. | |
| 7,783,720 B1 | 8/2010 | Allavarpu et al. | |
| RE43,065 E | 1/2012 | Grohn et al. | |
| 8,285,748 B2* | 10/2012 | Thomas | G06F 17/30522 707/713 |
| 8,429,179 B1 | 4/2013 | Mirhaji | |
| 8,429,189 B1* | 4/2013 | Spielberg | G06F 16/245 707/770 |
| 8,789,012 B1 | 7/2014 | Tolle | |
| 8,949,225 B2* | 2/2015 | Wu | G06F 17/30569 707/722 |
| 2003/0105762 A1* | 6/2003 | McCaffrey | G06F 21/6218 |
| 2005/0080791 A1 | 4/2005 | Ghatare | |
| 2005/0174991 A1* | 8/2005 | Keagy | H04L 29/06027 370/352 |
| 2005/0198149 A1* | 9/2005 | Johnson, II | H04L 12/58 709/206 |
| 2006/0190501 A1 | 8/2006 | Massironi | |
| 2008/0168523 A1* | 7/2008 | Ansari | G06Q 30/04 725/131 |
| 2008/0201234 A1 | 8/2008 | Castro et al. | |
| 2008/0201338 A1 | 8/2008 | Castro et al. | |
| 2009/0138437 A1* | 5/2009 | Krishnamoorthy | G06F 17/30448 |
| 2009/0187573 A1 | 7/2009 | Johnston et al. | |
| 2010/0145946 A1 | 6/2010 | Conrad et al. | |
| 2010/0153160 A1* | 6/2010 | Bezemer | G06Q 10/06 705/7.12 |
| 2010/0185643 A1* | 7/2010 | Rao | G06F 16/242 707/759 |
| 2010/0198778 A1 | 8/2010 | Venugopal et al. | |
| 2010/0228782 A1 | 9/2010 | Rao et al. | |
| 2011/0029548 A1 | 2/2011 | Enenkiel et al. | |
| 2011/0041171 A1 | 2/2011 | Burch et al. | |
| 2011/0047178 A1* | 2/2011 | Song | G06F 16/334 707/769 |
| 2011/0125904 A1* | 5/2011 | Branigan | G06F 17/30911 709/226 |
| 2011/0145729 A1* | 6/2011 | Shulman | G06Q 30/02 715/760 |
| 2011/0238683 A1* | 9/2011 | Kim | G06F 16/2452 707/760 |
| 2011/0276588 A1* | 11/2011 | Moon | G06F 16/832 707/769 |
| 2012/0173515 A1 | 7/2012 | Jeong et al. | |
| 2012/0179644 A1* | 7/2012 | Miranker | G06F 17/30563 707/605 |
| 2012/0192253 A1* | 7/2012 | Betsch | G06F 21/31 726/4 |
| 2012/0278334 A1* | 11/2012 | Abjanic | G06F 16/25 707/741 |
| 2012/0303668 A1 | 11/2012 | Srinivasan et al. | |
| 2013/0054623 A1 | 2/2013 | Chang | |
| 2013/0086210 A1 | 4/2013 | Yiu et al. | |
| 2013/0205028 A1 | 8/2013 | Crockett et al. | |
| 2013/0318070 A1* | 11/2013 | Wu | G06F 16/284 707/722 |
| 2013/0332473 A1 | 12/2013 | Ryman | |
| 2014/0280494 A1 | 9/2014 | Samoylenko et al. | |
| 2014/0358890 A1 | 12/2014 | Cheng et al. | |

OTHER PUBLICATIONS

"Apache Jena—Fuseki: serving RDF data over HTTP", [http://openjena.org/wiki/Fuseki] pp. 1-7, (Copyright 2011-2012).

'E.Prud'Hommeaux, et al. "SPARQL Query Language for RDF", Hewlett-Packard Laboratories, W3C Recommendation, pp. 1-88 (2008).

A. Cernian et al., "An Architecture for a Semantic Web Management System", Computing in the Global Information Technology, ICCGI Fourth International Multi-Conference, pp. 1-5 (2009).

D. Berrueta et al., "XLST+SPARQL: Scripting the Semantic Web With SPARQL Embedded Into XLST Stylesheets", Semnatic Web Conference, pp. 1-6 (2007).

Elkstein, M., "Learn Rest: A Tutorial", 5 Pages, Accessed on Line at <http://rest.elkstein.org/> on Nov. 28, 2015.

Oracle Date Sheet, "Oracle Database Gateways", Copyright 2007, 3 Pages, Accessed Online at <http://www.oracle.com/technetework/database/gateways/gateways-fov-133149.pdf> on Nov. 27, 2015.

Hartig et al. ("The SPARQL Query Graph Model for Query Optimization", The Semantic Web: Research and Applications, 2007—Springer), 15 pages.

Lanthaler et al., "Seamless Intergration of Restfull SServices Into the Web of Data", Hindawi Publishing Corporation, Advances in Multimedia, vol. 2012, Article ID 586542, 14 Pages, Accepted Date Jan. 15, 2012.

R. Battle et al., "Bridging the Semantic Web and Web 2.0 With Representational State Transfer (REST)", BBN Technologies, pp. 1-9 (2007).

W. Jones et al., "Reportable Rest Services Interfaces", Version 3.0 [http://open-services.net/pub/Main/ReportingHome/Reportable_Rest_Services_Interfaces-OSLC_Submission.pdf], pp. 1-23 (2009).

* cited by examiner

DATABASE QUERY LANGUAGE GATEWAY

CROSS-REFERENCE TO RELATED APPLICATION

This application is a continuation and claims the benefit of U.S. patent application Ser. No. 13/914,107, filed on Jun. 10, 2013 (now issued as U.S. Pat. No. 9,384,248), which claims the benefit of U.S. patent application Ser. No. 13/494,153, filed on Jun. 12, 2012 (now issued U.S. Pat. No. 9,183,265), the disclosures of which are hereby incorporated by reference herein in their entirety.

FIELD

The present invention relates to a database query language gateway, and more specifically, to a gateway configured to convert a query request to a modified SPARQL Protocol and Resource Description Framework (RDF) Query Language (SPARQL) query, and SPARQL query results to a reporting engine format.

BACKGROUND

Reporting engines receive data in a predetermined format and generate reports usable by users and systems using the data. Resource Description Framework (RDF) has emerged as a powerful tool for linking data, and RDF data may be stored and queried in a database to access the RDF data. SPARQL protocol and RDF query language (SPARQL) is a language that allows a user or system to access and query RDF data stored in a database, and are defined by the World Wide Web Consortium (W3C). However, reporting engines may not be capable of receiving, generating, managing, or interpreting SPARQL data, and the reporting engines may thus be unable to generate reports based on RDF data stored in a database.

SUMMARY

According to one embodiment of the present disclosure, a system includes a database endpoint device; a database, external to and communicatively coupled to the database endpoint device, comprising a memory storing data; and a gateway, external to and communicatively coupled to the database endpoint device, comprising a controller, wherein the system is configured to provide a data service to at least one program, and wherein the system is configured to provide the data via the data service as requested by the at least one program.

According to another embodiment of the present disclosure, a method communicatively coupling a database endpoint device and a database comprising a memory storing data, wherein the database is external to the database endpoint device; communicatively coupling the database endpoint device and a gateway comprising a controller, wherein the gateway is external to the database endpoint device; providing a data service to at least one program; and providing the data via the data service as requested by the at least one program.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present disclosure provide a database query language gateway configured to convert query parameters into a query of a database query language query and to convert query results to a reporting engine format to allow a reporting engine to generate a report based on the database query results.

It is understood in advance that although this disclosure includes a detailed description on database queries in a network environment, implementation of the teachings recited herein are not limited to a network environment. Rather, embodiments of the present invention are capable of being implemented in conjunction with any other type of computing environment now known or later developed.

Figure 1:
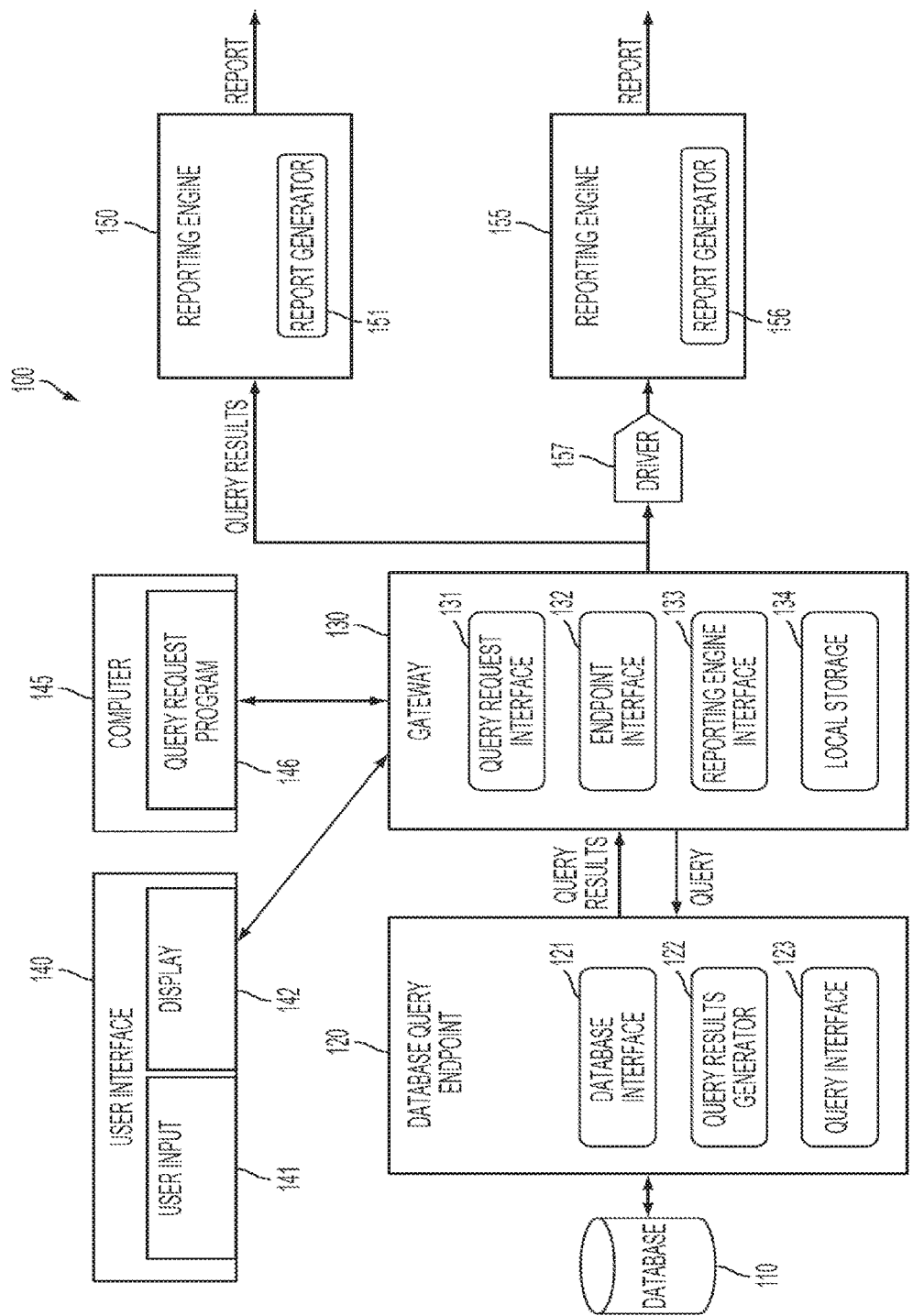
FIG. 1 illustrates a block diagram of a database query system according to an embodiment of the present disclosure.

Referring to FIG. 1, a database query system 100 includes a database 110, a database query endpoint 120, a gateway 130, and one or more reporting engines 150 and 155.

The gateway 130 receives a query request and modifies a query in a database query language based on the query request. As illustrated in FIG. 1, query request devices include a user interface device 140 including a user input 141 and a display 142. Examples of user interface devices 140 include personal desktop computers, laptops, mobile computing devices such as personal data assistants, tablet computers, smartphones, or any other device capable of receiving a user input, converting the user input to a digital signal in the form of a query request, and transmitting the query request to the gateway 130.

In one embodiment, the user interface device 140 is configured to provide a web user interface which may be displayed on the display 142 and with which the user may interact via the user input 141. The user may configure the gateway 130 with the web user interface.

Another example of a query request device is a computer 145 which generates a query request as a result of an operation of a query request program 146, and not based on a user input. The computer 145 may include a processor, memory, and a data interface to interface with the gateway 130. The query request program may be a software program stored in memory and executed by the processor to generate a query request at a certain time and having a pre-programmed query object. In other words, a query request may be generated based on a user input from a user interface 140, or automatically in the process of an executing program being executed by a computer 145. In one embodiment, the computer 145 uses a REST application programming interface (API) to configure the gateway 130.

Reporting engines 150 and 155 include report generators 151 and 156, respectively, configured to generate reports. In particular, reporting engines 150 and 155 are configured to receive raw data and organize the raw data into a predetermined reporting format for storage, display, printing, or performing any other process. The report may be, for example, an html file, a pdf file, word processing document, image document, any other electronically storable file, or any displayable file.

In embodiments of the present disclosure, the user interface 140, computer 145, and reporting engines 150 and 155 may be part of the same device or may be separate devices. For example, the computer 145 may not represent a separate device from the user interface 140, but rather that the computer 145 generates the query request without use of the user interface 140. The query request may be generated using software or hardware corresponding to the reporting engines 150 or 155. For example, a user may open a program utilizing the reporting engine 150 on a computer and may use the user interface 140 to generate a query in the program utilizing the reporting engine 150.

The gateway 130 receives the query request at a query request interface 131 including any query search terms and modifies a pre-stored query in a database query language to generate a query based on the query search terms of the query request. The gateway 130 transmits the query to the database query endpoint 120 via the endpoint interface 132. The database query endpoint 120 receives the query in the database query language at a query interface 123. The database interface 121 queries the database 110 based on the search terms in the query and outputs the results to a query results generator 122, which generates query results. The query results are transmitted from the query interface 123 to the gateway 130, where a reporting engine interface 132 converts the query results to a reporting engine language to communicate with one or more reporting engines 150 or 155.

In embodiments of the present disclosure, the query request interface 131, the endpoint interface 132, and the reporting engine interface 133 may be software programs stored in memory and executed by a processor to perform interfacing, data processing, data conversion, and other operations. In addition, any one or more of the query request interface 131, the endpoint interface 132, and the reporting engine interface 133 may include a processor, memory, and any supporting logic required to execute the interfacing, data processing, data conversion, and other operations. In one embodiment, one or more of the query request interface 131, the endpoint interface 132, and the reporting engine interface 133 may share a processor or memory, and in an alternative embodiment, one or more of the query request interface 131, the endpoint interface 132, and the reporting engine interface 133 may include separate hardware including a processor, memory, and logic circuitry. In one embodiment, the gateway 130 includes local storage 134 that may be accessed by one or more of the query request interface 131, the endpoint interface 132 and the reporting engine interface 133. For example, the local storage 134 may query and endpoint resources.

In addition, in embodiments of the present disclosure, the database interface 121, the query results generator 122, and the query interface 123 may be software programs stored in memory and executed by a processor to perform interfacing, data processing, query response generation, database searching, data conversion, and other operations. In addition, any one or more of the database interface 121, the query results generator 122, and the query interface 123 may include a processor, memory, and any supporting logic required to execute the interfacing, data processing, query response generation, database searching, data conversion, and other operations. In one embodiment, one or more of the database interface 121, the query results generator 122, and the query interface 123 may share a processor or memory, and in an alternative embodiment, one or more of the database interface 121, the query results generator 122, and the query interface 123 may include separate hardware including a processor, memory, and logic circuitry.

The gateway 130 converts the query results into a reporting engine language with the reporting engine interface 133, and outputs the query results in the reporting engine language. A reporting engine 150 may receive the query results directly from the gateway 130 in the reporting engine language and may generate a report including the query results with a report generator 151. The report may be, for example, an html file, a pdf file, word processing document, image document, any other electronically storable file, or any displayable file.

The reporting engine 155 may be incapable of generating a report based directly on the reporting engine language output by the gateway 130. Accordingly, the reporting engine 155 may include a driver 157 between the reporting engine 155 and the gateway 130 to convert the reporting engine language into a second reporting engine language capable of being used to generate a report by the report generator 156.

Accordingly, as illustrated in FIG. 1, embodiments of the present disclosure provide a gateway 130 configured to receive a query request from one or more sources including a user and a computer program, to generate a query and transmit the query to a database query endpoint 120, and to convert a resulting query response into a format readable or convertible by one or more reporting engines 150 and 155.

Embodiments of the present disclosure include a SPARQL protocol and RDF query language (SPARQL) gateway. In one embodiment, the SPARQL gateway is a software component that enables reporting on Linked Data sources. Linked Data uses Resource Description Framework (RDF) as the data mode for describing resources.

A client of a development tool may request an RDF representation of any development artifact via an HTTP GET request that contains an Accept header for an RDF media type. The representations of many development artifacts from many tools may be stored in an RDF database known as a triple store which integrates the data and enables queries across all the data using the RDF query language SPARQL.

Figure 2:
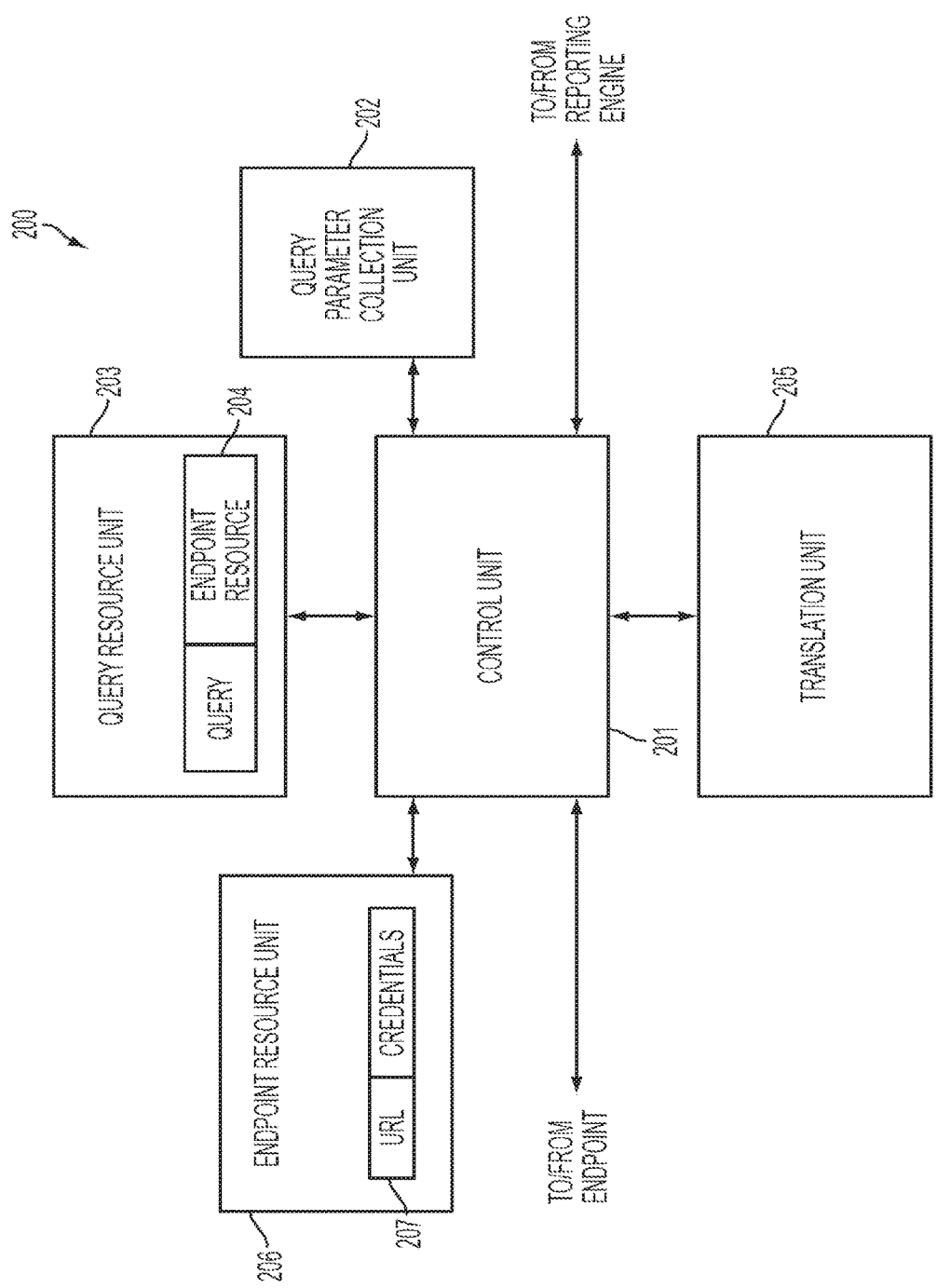
FIG. 2 illustrates a block diagram of a gateway according to an embodiment of the present disclosure.

FIG. 2 illustrates a block diagram of a gateway 200 according to an embodiment of the present disclosure. The gateway 200 may correspond to the gateway 130 of FIG. 1, and may be a SPARQL gateway configured to transmit a modified SPARQL query to a SPARQL endpoint. The gateway 200 includes a control unit 201 configured to control operations of the gateway, including timing, processing, and input/output operations. The control unit 201 may comprise software executed by a processor, or may comprise any combination of software and hardware including logic circuits, timing circuits, I/O circuits, memory, and other circuitry.

A query parameter collection unit 202 is configured to extract query parameters or conditions from a query request. A query resource unit 203 includes one or more query resources 204 that associate a predefined SPARQL query with an endpoint resource. Each query resource 204 is used to send a query to the endpoint resource to obtain query results, and each query resource 204 may refer to exactly one endpoint resource.

A translation unit 205 is configured to translate query parameters from a query request into a modified query using a predefined SPARQL query of the query resource unit 203. In addition, the translation unit 205 is configured to translate query results into a format usable by a reporting engine. An endpoint resource unit 206 stores one or more endpoint resources 207 including a uniform resource locator (URL) of a SPARQL query service and any credentials, such as user identifications (ID), passwords, etc., necessary to access the SPARQL query service via the URL.

The gateway 200 of FIG. 2 may be configured by a user or by a computer program. When configured by a user, the user may use a Web user interface to configure the gateway 200. When configured by a computer program, the program may use a REST application API.

In operation, the control unit 201 receives from a reporting engine or other query generating device or program a query request including query parameters and a data service URL. The query parameters may be part of the request sent to the data service URL. The query parameter collection unit 202 obtains the query parameters from the request, and the control unit 201 retrieves from the query resource unit 203 a SPARQL query associated with the data service URL.

The query parameter translation unit 205 translates the incoming query parameters into SPARQL filter statements that are added to the SPARQL query stored in the query resource unit 203. In other words, in one embodiment, the gateway 200 does not generate the query from scratch, but rather modifies a stored SPARQL query of a query resource 204 in the query resource unit 203 to include conditions defined by the query parameters of the query request.

The control unit 201 transmits the query, including any necessary credentials, to the URL defined by the query, and receives in response query results from an endpoint, such as the database query endpoint 120 of FIG. 1. The query parameter translation unit 205 converts the query results into a format usable by a reporting engine and transmits the query results to the reporting engine.

Figure 3:
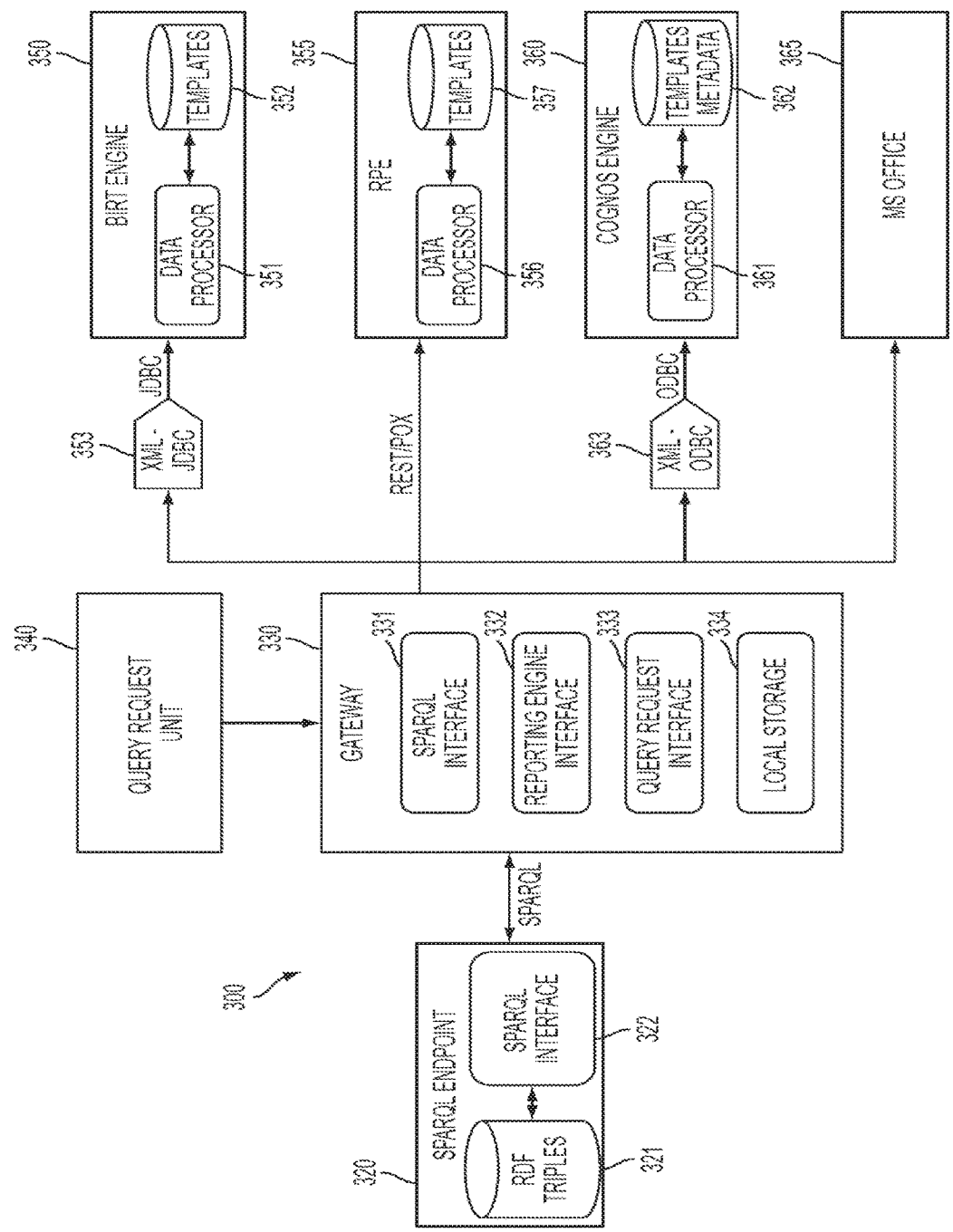
FIG. 3 illustrates a block diagram of a database query system according to an embodiment of the present disclosure.

FIG. 3 illustrates a block diagram of a query request system 300 including a SPARQL gateway 330 according to one embodiment of the present disclosure. In FIG. 3, the SPARQL gateway 330 makes a SPARQL query result appear to a reporting engine as a Reportable Representational State Transfer (Reportable REST) data source accessible by the reporting engine as a language for generating a report including the query results data.

In particular, the SPARQL gateway 330 includes a SPARQL interface 331, a reporting engine interface 332, and a query request interface 333. The SPARQL gateway 330 may correspond to the gateway 130 of FIG. 1 and 200 of FIG. 2. The query request interface 333 receives a query request from the query request unit 340. The query request unit 340 may include a user input unit, such as a personal computer, or a program executed by a computer. The query request unit 340 may correspond to the user interface 140 or the computer 145 of FIG. 1.

Upon receipt of the query request from the query request unit 340, the SPARQL interface 331 modifies a stored SPARQL query and transmits the modified SPARQL query to the SPARQL endpoint 320. The SPARQL endpoint includes a SPARQL interface 322 to receive the SPARQL query and to access the RDF triples 321 containing RDF data based on the modified SPARQL query. The SPARQL interface 322 returns query results as SPARQL data to the SPARQL interface 331. Upon receipt of the SPARQL data, the gateway 330 converts the SPARQL data with the reporting engine interface 332 to a language corresponding to one or more reporting engines. In one embodiment, the reporting engine interface 332 converts the SPARQL query results into Plain Old XML (POX) transmitted over REST (REST/POX). In one embodiment, the gateway 330 includes local storage 334 that may be accessed by one or more of the query request interface 131, the endpoint interface 132 and the reporting engine interface 133. For example, the local storage 134 may query and endpoint resources.

In an embodiment illustrated in FIG. 3, reporting engines include a Business Intelligence and Reporting Tools (BIRT) engine 350, a Rational Publishing Engine (RPE) 355, a Cognos engine 360, and a Microsoft Office™ program 365, such as Excel™. The SPARQL gateway 330 transmits the REST/POX data to one or more of the BIRT engine 350, the RPE 355, and the Cognos engine 360 which are configured to receive the REST/POX data and to generate a report based on the query results using the REST/POX data. In one embodiment, the BIRT engine 350, RPE 355, and Cognos engine 360 are incapable of generating a report using SPARQL data directly. Accordingly, the gateway 330 generates the SPARQL query and converts the query results to a REST/POX language accessible by the BIRT engine 350, RPE 355, and Cognos engine 360.

The BIRT engine 350 may include data storage 352 including templates for generating reports and a data processor 351 for receiving query results and applying the query results to a BIRT template to provide a BIRT report. The BIRT engine 350 may further include or be connected to a driver 353 to convert XML data output from the SPARQL gateway 330 into Java Database Connectivity (JDBC) data readable by the BIRT engine 350.

The RPE 355 may directly receive the REST/POX data, and may include data storage 357 including templates, and a data processor 356 to apply the REST/POX data to the templates to generate an RPE report.

The Cognos engine 360 may include data storage 362 including templates for generating reports and a data processor 361 for receiving query results and applying the query results to a Cognos template to provide a Cognos report. The Cognos engine 360 may further include or be connected to a driver 363 to convert XML, data output from the SPARQL gateway 330 into Open Database Connectivity (ODBC) data readable by the Cognos engine 360.

In one embodiment of the present disclosure, the reporting engines 350, 355, and 360, the query request unit 340, the SPARQL gateway 330, and the SPARQL endpoint 320 all include computer programs executed by a processor and including supporting logic, and are all located on separate computers or in separate devices. The SPARQL data, the query request, and the query results may all be transmitted via a network, such as a wired network or a wireless network. In another embodiment, two or more of the reporting engines 350, 355, and 360, the query request unit 340, the SPARQL gateway 330, and the SPARQL endpoint 320 are located on a same computer or in a same device. For example, a user, computer program, or reporting engine may generate a query request from a computer terminal and may access a server via a network to generate query parameters. The computer terminal may transmit the query request including query parameters to the server to generate a modified query in the server. Query results may be transmitted from the server back to one or more reporting engines 350, 355, or 360 located in the computer terminal.

In yet another embodiment, each of the query request unit 340, the SPARQL gateway 330 and the reporting engines 350, 355, and 360 may be located, stored, and/or executed in the same computer terminal. The computer terminal may transmit a modified SPARQL query to the SPARQL endpoint 320 via a wired or wireless network.

In one embodiment, the SPARQL gateway 330 is a web application. In one embodiment the web application is implemented as a Java servlet, although embodiments of the present disclosure encompass any appropriate web technology to execute the web application. The SPARQL gateway 330 may provides a REST Application Programming Interface (API) and a web User Interface (UI) for managing all of its resources. These include SPARQL endpoints 320 and SPARQL queries. The REST API and web UI support the creation, modification, deletion and retrieval of the resources managed by the SPARQL gateway 330. The web UI delegates actions to the REST API.

The SPARQL gateway 330 may have a base Uniform Resource Identifier (URI) which represents the SPARQL gateway 330 application as a whole. An HTTP GET request may be configured to return useful information about the SPARQL gateway 330 and links to its main resources. The response may be configured to be either HTML or RDF, depending on an Accept header. If HTML is requested, then the SPARQL gateway 330 may provide a very simple user interface for managing the SPARQL gateway 330 and accessing its resources. For example, a SPARQL gateway 330 base URI may be:

http://example.org/gateway

The gateway may manage a set of SPARQL endpoints 320. Each SPARQL endpoint 320 may have a URI that supports the SPARQL protocol. The SPARQL gateway 330 manages other descriptive information about each SPARQL endpoint 320, e.g. a title and description, so that users may easily select the SPARQL endpoint 320 that they want to query. An example URI for a set of SPARQL endpoint 320 descriptions may be:

http://example.org/gateway/endpoint

An HTTP GET request on the SPARQL endpoint 320 set URI gives a list of the endpoint descriptions. An HTTP POST to this URI creates a new endpoint description. A URI of a SPARQL endpoint 320 description may be:

http://example.org/gateway/endpoint/3

A SPARQL endpoint 320 description may be retrieved, modified, and deleted by sending HTTP GET, PUT, and DELETE requests to its URI. The SPARQL gateway 330 manages a set of SPARQL queries. These may be written by hand or generated by some other tool. The SPARQL gateway 330 assigns each query a URI which supports the Reportable REST API. A URI for the set of queries may be:

http://example.org/gateway/query

An HTTP GET request on the query may give a list of the queries. An HTTP POST to this URI creates a new query. A URI of a query may be:

http://example.org/gateway/query/42

A query may be retrieved, modified, and deleted by sending HTTP GET, PUT, and DELETE requests to its URI. The SPARQL gateway 330 may make the query behave as a Reportable REST data service. The URI for the data service defined by query 42 may be:

http://example.org/gateway/query/42/dataservice

The SPARQL gateway 330 may manage some metadata about each SPARQL query. This metadata may be inferred by parsing the SPARQL query or it may be provided explicitly with the SPARQL query or by an administrator. For example, when a SPARQL query is a SELECT query, the metadata may include the names and data types of the columns of the result set. The SPARQL gateway 330 may use this metadata to generate an XML Schema to describe the Reportable REST result. It also uses this metadata to generate other artifacts as described below. The URI of the XML schema that describes the Reportable REST data service for query 42 may be:

http://example.org/gateway/query/42/dataservice/xsd

When the SPARQL gateway 330 receives an HTTP request on a Reportable REST URI associated with a SPARQL query, it may perform the following functions: 1) The SPARQL gateway 330 parses the query parameters on the request URI. These query parameters may be in an XPath syntax defined by the Reportable REST specification. The query parameters specify filtering conditions. 2) The SPARQL gateway 330 may transform the XPath filtering conditions into SPARQL graph patterns and adds then to the WHERE clause of the SPARQL query. 3) The SPARQL gateway 330 may send the modified SPARQL query to the SPARQL endpoint 320. 4) The SPARQL gateway 330 may receive the result of the SPARQL query. 5) The SPARQL gateway 330 may transform the result of the SPARQL query into an XML format that is conformant with the Reportable REST specification and returns it in the HTTP response.

Accordingly, the SPARQL gateway 330 may provide a means of providing query results from a SPARQL query to a reporting engine to allow the reporting engine, which may not have a SPARQL compatibility, to generate a report based on the SPARQL query.

Figure 4:
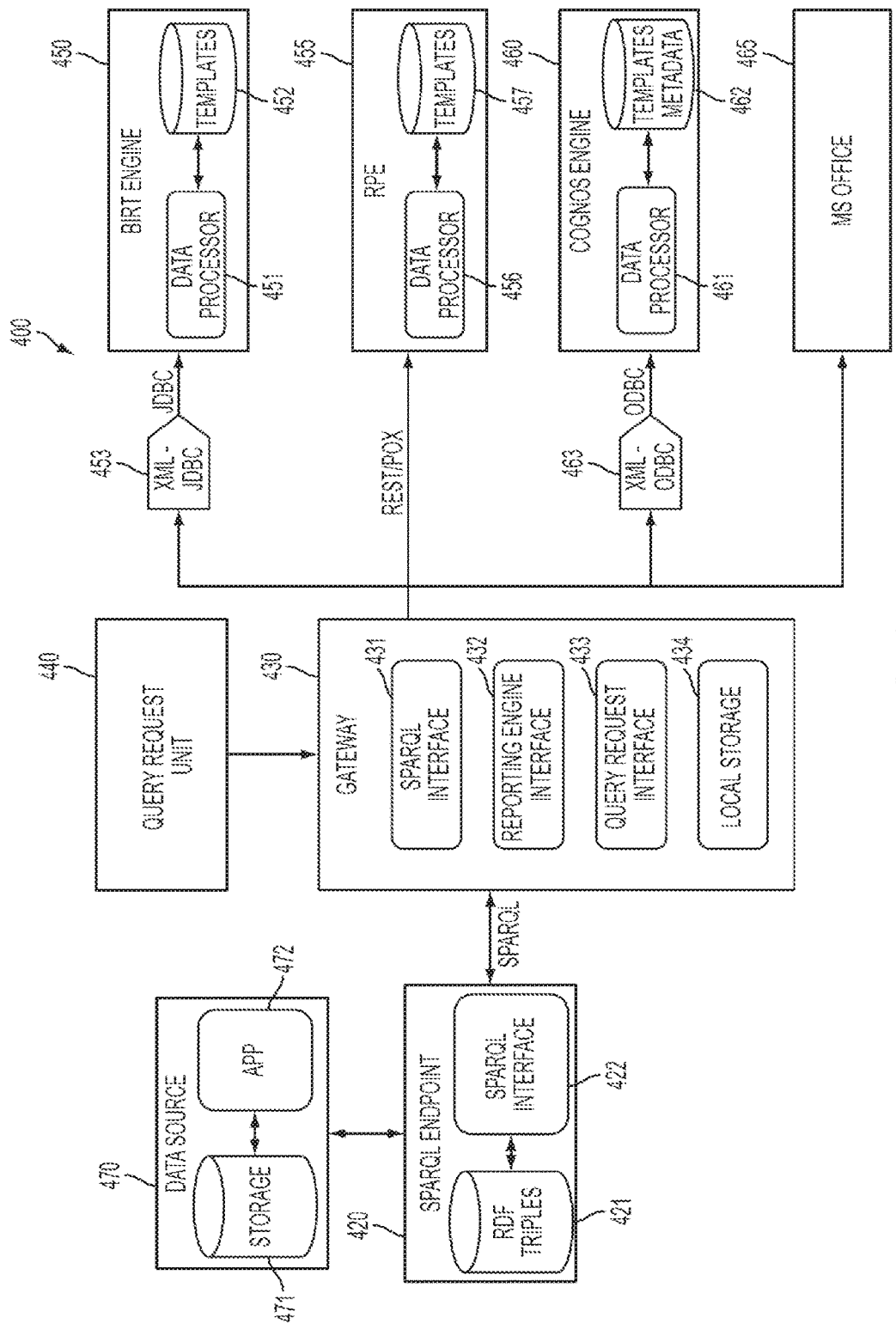
FIG. 4 illustrates a block diagram of a database query system according to another embodiment of the present disclosure.

FIG. 4 illustrates a block diagram of a query request system 400 including a SPARQL gateway 430 according to another embodiment of the present disclosure. The system 400 of FIG. 4 is similar to that of FIG. 3, except the system 400 of FIG. 4 further includes a data source 470 connected to the SPARQL endpoint 420. The data source 470 may be, for example, a web page or group of web pages including RDF data. The data source 470 may include an application 472, such as a web site, and storage 471 to store web page data including the RDF data. The SPARQL endpoint 420 may obtain from the data source 470 some or all of the RDF data from the data source 470, and may store the RDF data in the RDF triples 421 to be accessed by a SPARQL query.

Figure 5:
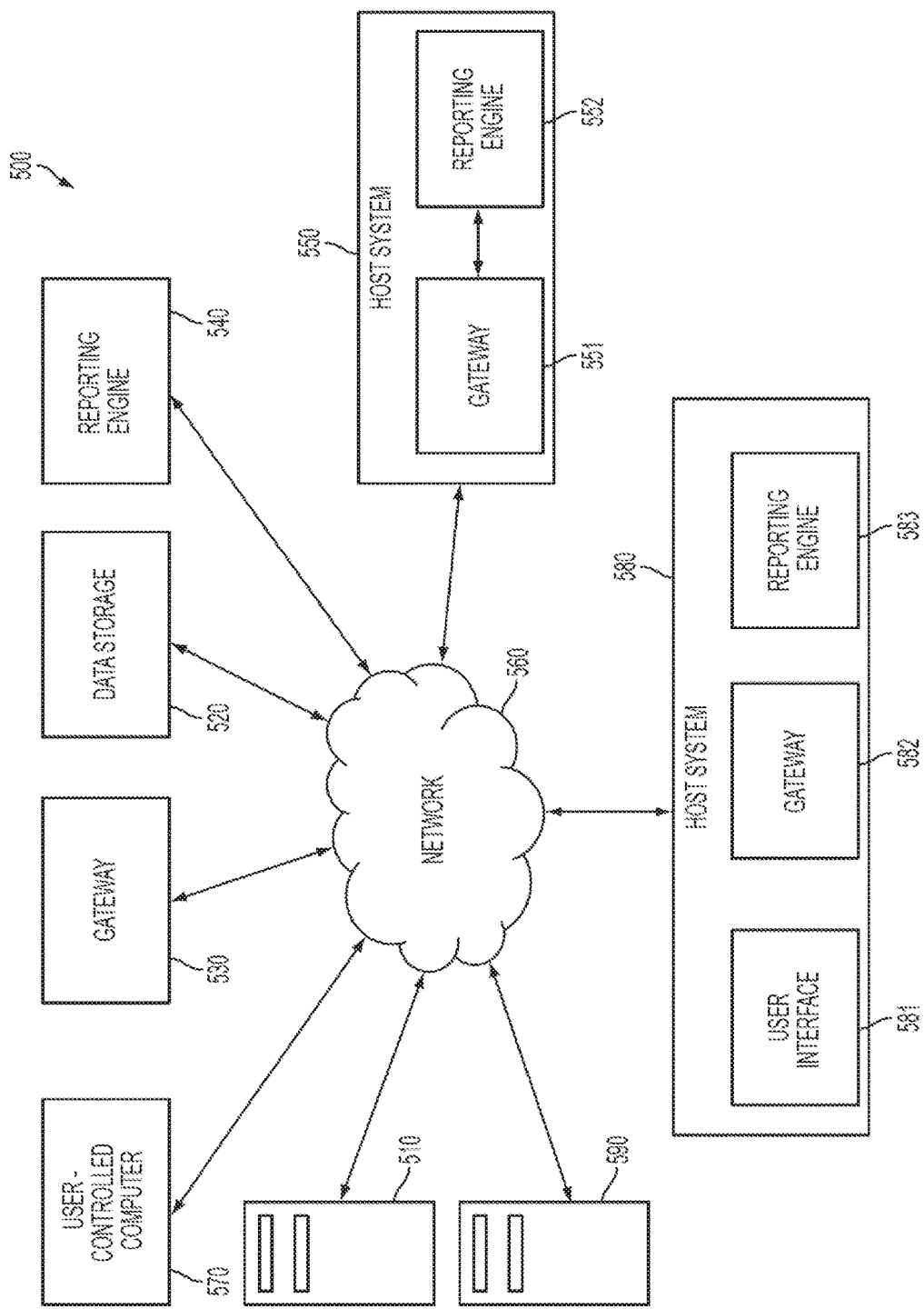
FIG. 5 illustrates a database query system according to an embodiment of the present disclosure.

FIG. 5 illustrates a SPARQL query system 500 according an embodiment of the present disclosure. The system 500 may include a user-controlled computer 570 connected to a network 560. The user-controlled computer 570 may include one or more processors, memory, logic circuits, and a user interface to receive a user input to generate a query and to transmit a query request to a gateway 530 or 551. The user-controlled computer 570 may correspond to the user interface 140 of FIG. 1.

The system 500 may also include one or more servers or computers 510 to run programs to generate query requests. The computer 510 may run the programs to generate query requests without a user input. For example, a computer readable medium, such as a disk or solid-state memory device including a computer program configured to generate a query request may be provided to the computer 510 to control the computer to automatically generate the query request without user input.

The system 500 may include a gateway 530, 551, or 582. The gateways 530, 551, and 582 may be computer programs stored in memory and executed by a processor and may correspond to the gateways 130, 200, 330 and 430 of FIGS. 1-4, respectively. The gateway 530 may be part of a computer connected to the network 560, and may be in a separate device or computer than the user-controlled computer 570, the computer 510, and the host systems 550 and 580. The gateway 530 may be accessed by the user-controlled computer 570 or computer 510 via the network 560 and may transmit query results to the reporting engine 540 via the network 560.

The system 500 may include one or more host systems 550, 580. The host system 550 may comprise a computer, server, local area network (LAN), or other assembly including a gateway 551 and a reporting engine 552. The host system 580 may comprise a computer, server, LAN, or other assembly including a gateway 582, user interface 581, and a reporting engine 583. The user interface 581 may correspond to the user interface 140 of FIG. 1. The reporting engines 552 and 583 may correspond to the reporting engine 150 or the reporting engine 155 of FIG. 1.

The system 500 may further include a server or computer 590 corresponding to the database query endpoint 120 of FIG. 1. The server or computer 590 may include a query interface and database interface. In one embodiment, the server or computer 590 includes a database, and the database interface in the server or computer 590 queries the database within the server or computer 590. In another embodiment, the system 500 includes data storage 520, such as volatile memory or non-volatile memory having stored therein a database. The server or computer 590 may query the database stored in the data storage 520 to generate query results.

In other words, in some embodiments one or more of the user interface, gateway, reporting engines, and database query endpoints are stored in a same computer or server. In other embodiments, one or more of the user interface, gateway, reporting engines, and database query endpoints are located in separate devices, housings, or systems and are connectable to each other via a wireless network, wired network, or a combination of the two.

The gateway, database query endpoints, and reporting engines of the above-described embodiments may be operational with numerous other general purpose or special purpose computing system environments or configurations. Examples of well-known computing systems, environments, and/or configurations that may be suitable for use with gateways, database query endpoints, and reporting engines of embodiments of the present disclosure include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The gateway, database query endpoints, and reporting engines of the above-described embodiments may be described in the general context of computer system-executable instructions, such as program modules, being executed by a computer system. Generally, program modules may include routines, programs, objects, components, logic, data structures, and so on that perform particular tasks or implement particular abstract data types. The gateway, database query endpoints, and reporting engines of the above-described embodiments may be practiced in distributed cloud computing environments where tasks are performed by remote processing devices that are linked through a communications network. In a distributed cloud computing environment, program modules may be located in both local and remote computer system storage media including memory storage devices.

The gateway, database query endpoints, and reporting engines of the above-described embodiments may include computer system readable media in the form of volatile memory, such as random access memory (RAM) and/or cache memory. The gateway, database query endpoints, and reporting engines of the above-described embodiments may further include other removable/non-removable, volatile/non-volatile computer system storage media. By way of example only, storage systems may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. Memory may include at least one program product having a set (e.g., at least one) of program modules that are configured to carry out the functions of embodiments of the invention.

Figure 6:
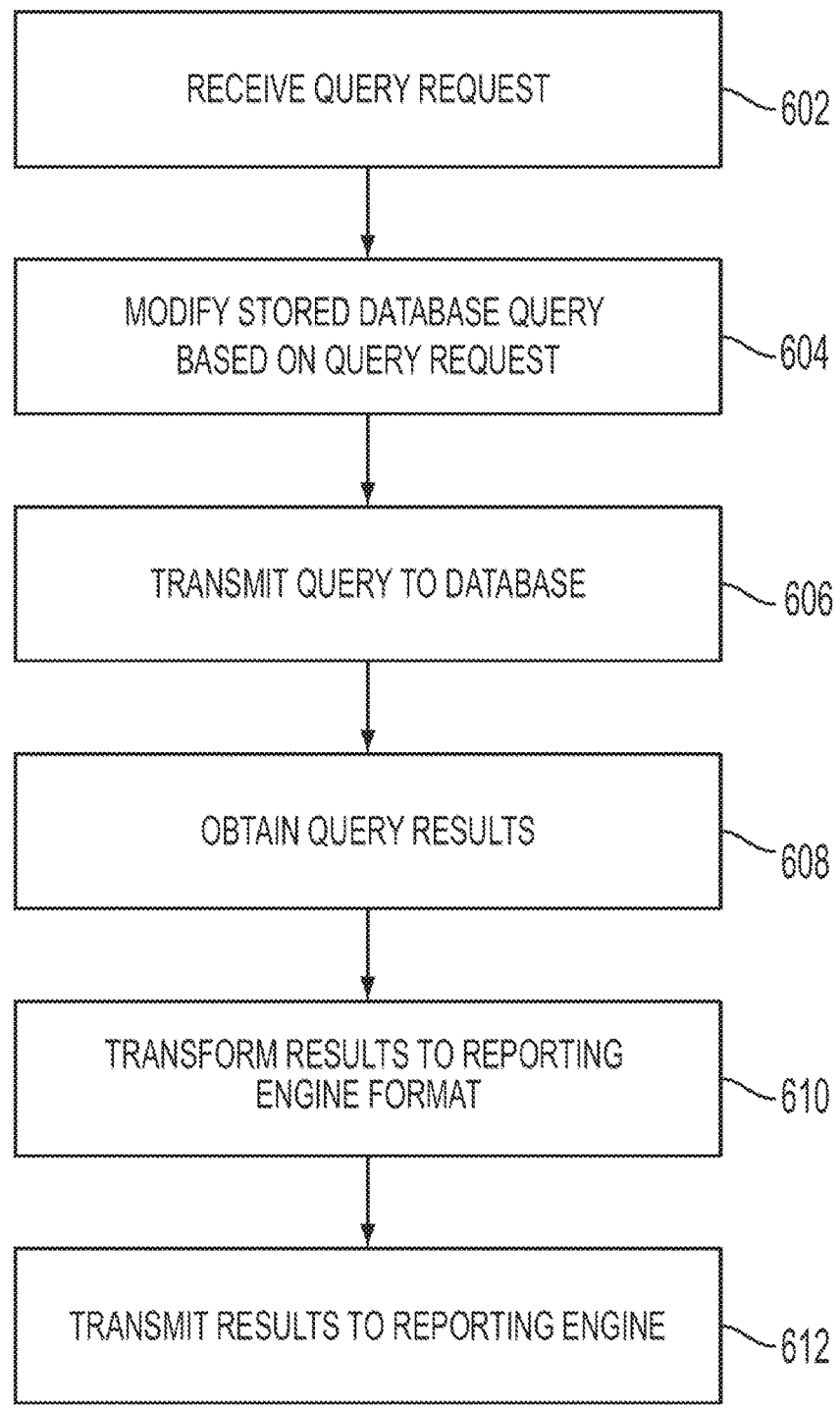
FIG. 6 is a flowchart illustrating a method according to an embodiment of the present disclosure.

FIG. 6 illustrates a method according to an embodiment of the present disclosure. In block 602, a query request is received by a SPARQL gateway. The query request may include a data service URL and query parameters.

In block 604, the gateway may obtain the query parameters from the query request and may modify a stored query based on the query parameters. The SPARQL gateway parses the query parameters on a request URI. The query parameters may be in an XPath syntax defined by the Reportable REST specification, and the query parameters specify filtering conditions. The SPARQL gateway may transform the XPath filtering conditions into SPARQL graph patterns and adds then to a WHERE clause of the SPARQL query.

In block 606, the gateway transmits the query to a database. The database may be part of a database query endpoint or may be connected to the database query endpoint. In particular, the SPARQL gateway may send the modified SPARQL query to the SPARQL endpoint.

In block 608, the gateway obtains query results from the database or from the database query endpoint. The query results may be in the database query language, or in SPARQL. In block 610, the gateway converts the query results from the database query language into a reporting engine format. The reporting engine format may be a REST/POX format. In block 612, the gateway transmits the query results to the reporting engine, which generates a report based on the query results.

Providing as an example, implementation of one embodiment, an RDF database may have a list of all the cities in the world and all the countries in which the cities are located. A SPARQL query may be generated in a gateway to return all cities and the corresponding countries. The SPARQL query may be associated with the RDF database.

A query request may be generated by a reporting engine or other query request source to determine all the cities in Canada. For example, a user may access a web page corresponding to the gateway and may select "Canada" from a list of countries provided on the web page and corresponding to a SPARQL query stored in the gateway and associated with the RDF database. The gateway may modify the stored SPARQL query to search from cities in all countries of the world to limit the query to only cities in Canada based on the user selection. In other words, the gateway extracts the "Canada" parameter from the query request and rewrites the stored SPARQL query to filter the query results to return only the cities of Canada.

A gateway may be configured to include any number of pre-stored SPARQL queries that may be modified by query requests. Once the SPARQL query is generated and stored in the gateway, the SPARQL query may be accessed and modified any number of times in subsequent query requests.

Embodiments of the present disclosure encompass a gateway configured to generate a query in a database query language, obtain query results, and convert the query results into a reporting engine format. Embodiments of the present disclosure further encompass assemblies, systems, and methods configured to generate a query in a database query language, obtain query results, and convert the query results into a reporting engine format. Accordingly, multiple different types of reporting engines which are not configured to communicate with a database are able to obtain database query results from a same query or different queries by means of a gateway to convert query results into a format accessible by the reporting engines.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
   a database endpoint device;
   a database, external to and communicatively coupled to the database endpoint device, comprising a memory storing data;
   a reporting engine not configured to communicate with the database; and
   a gateway, external to and communicatively coupled to the database endpoint device, comprising a controller, the gateway being configured to include a plurality of pre-stored SPARQL queries that are modifiable by query requests,
   wherein the controller of the gateway, on behalf of the system:
      receives from at least one program a query request including query parameters and locator of a data service,
      in response to the query request, provides the data service to the at least one program by
         retrieving from a query resource unit of the gateway a pre-stored SPARQL query of the plurality of pre-stored SPARQL queries and modifying the pre-stored SPARQL query to generate a modified query comprising the query parameters from the query request translated into a database query language,
         transmitting the modified query to the database endpoint device, the modified query being a SPARQL query,
         receiving query results in the database query language in response to the modified query,
         converting the query results from the database query language to a format including a Reportable Representational State Transfer data source accessible and executable by the reporting engine,
         transmitting the converted query results to the reporting engine, the converted query results being in the format accessible and executable by the reporting engine, and
   wherein the database, on behalf of the system, provides the data via the data service of the gateway as requested by the at least one program,
   wherein the database endpoint device, on behalf of the system, receives the modified query from the gateway, and
   wherein the reporting engine obtains the converted query results via the transmitting by the gateway and generates a report in direct correspondence with the converted query results and format thereof.

2. The system of claim 1, wherein a query parameter collector of the gateway obtains the query parameters from the query request.

3. The system of claim 1, wherein the query request is sent to a data service uniform resource locator (URL).

4. The system of claim 3, wherein the modified query is associated with the data service URL.

5. The system of claim 1, wherein the database is a Resource Description Framework (RDF) triple database that stores Resource Description Framework (RDF) data as the data.

6. The system of claim 1, wherein the at least one program comprises a query request program, stored in a second memory of a computer and executed by a processor of the computer, configured to generate a query request at a certain time and having a pre-programmed query object.

7. A method comprising:

communicatively coupling a database endpoint device and a database comprising a memory storing data, wherein the database is external to the database endpoint device;

communicatively coupling the database endpoint device and a gateway comprising a controller, wherein the gateway is external to the database endpoint device, the gateway being configured to include a plurality of pre-stored SPARQL queries that are modifiable by query requests;

communicatively coupling the gateway and a reporting engine not configured to communicate with the database;

receiving, by the controller of the gateway from at least one program, a query request including query parameters and locator of a data service;

providing, by the controller of the gateway in response to the query request, the data service to the at least one program by retrieving from a query resource unit of the gateway a pre-stored SPARQL query of the plurality of pre-stored SPARQL queries and modifying the pre-stored SPARQL query to generate a modified query comprising the query parameters from the query request translated into a database query language, transmitting, by the gateway, the modified query to the database endpoint device, the modified query being a SPARQL query, receiving, by the gateway, query results in the database query language in response to the modified query, converting, by the controller of the gateway, the query results from the database query language to a format including a Reportable Representational State Transfer data source accessible and executable by the reporting engine, transmitting the converted query results to the reporting engine, the convened query results being in the format accessible and executable by the reporting engine;

providing, by the database, the data via the data service as requested by the at least one program;

receiving, by the database endpoint device, the modified query from the gateway;

obtaining, by the reporting engine, the converted query results via the transmitting by the gateway; and generating, by the reporting engine, a report in direct correspondence with the converted query results and format thereof.

8. The method of claim 7, further comprising obtaining, by a query parameter collector of the gateway, the query parameters from the query request.

9. The method of claim 7, wherein the query request is sent to a data service uniform resource locator (URL).

10. The method of claim 9, wherein the modified query is associated with the data service URL.

11. The method of claim 7, wherein the database is a Resource Description Framework (RDF) triple database that stores Resource Description Framework (RDF) data as the data.

12. The method of claim 7, wherein the at least one program comprises a query request program, stored in a second memory of a computer and executed by a processor of the computer, configured to generate a query request at a certain time and having a pre-programmed query object.

* * * * *